United States Patent
Wade et al.

[11] Patent Number: 5,352,020
[45] Date of Patent: Oct. 4, 1994

[54] HYDRAULIC EXTENDABLE LEGREST

[75] Inventors: Douglas L. Wade, Gainesville; Wade Walterscheid, Lindsay; Jim Shepherd, Gainesville, all of Tex.

[73] Assignee: Weber Aircraft, Inc., Gainesville, Tex.

[21] Appl. No.: 911,874

[22] Filed: Jul. 10, 1992

[51] Int. Cl.$^5$ .............................. A47C 7/50
[52] U.S. Cl. ............ 297/423.26; 297/423.19
[58] Field of Search .......... 297/423.1, 423.26, 423.27, 297/423.3, 423.31, 423.32, 423.34, 423.35, 423.19, 433–436, 423, 69, 70, 75

[56] References Cited

U.S. PATENT DOCUMENTS

| | | | |
|---|---|---|---|
| 403,318 | 5/1889 | Arnold | 297/435 |
| 945,928 | 1/1910 | Fowler et al. | 297/70 |
| 2,563,629 | 8/1951 | Watter | 297/435 |
| 2,571,080 | 10/1951 | Watter | 297/435 |
| 2,918,964 | 12/1959 | Braun | 297/434 |
| 3,051,274 | 8/1962 | Porter | 188/96 |
| 3,096,118 | 7/1963 | Dubeck | 297/75 |
| 3,177,980 | 4/1965 | Porter | 188/96 |
| 3,380,561 | 4/1968 | Porter | 188/96 |
| 3,659,684 | 5/1972 | Porter | 188/322 |
| 3,760,911 | 9/1973 | Porter | 188/300 |
| 3,860,098 | 1/1975 | Porter | 188/300 |
| 3,874,480 | 4/1975 | Porter | 188/67 |
| 4,155,433 | 5/1979 | Porter | 188/300 |
| 4,264,103 | 4/1981 | Peresada | 297/432 |
| 4,336,965 | 6/1982 | Lipp | 297/435 |
| 4,509,795 | 4/1985 | Brennan | 297/434 |
| 4,819,987 | 4/1989 | Stringer | 297/434 |

OTHER PUBLICATIONS

Weber Aircraft, Inc. Component Maintenance Manual, First Class Electrical Installation, pp. 1098.26; 1098.30; 1098.32; 1098-34; 1098.36; 1098.38; 1098.42.

Primary Examiner—Peter R. Brown
Assistant Examiner—Milton Nelson, Jr.
Attorney, Agent, or Firm—Crutsinger & Booth

[57] ABSTRACT

A legrest assembly mounted on the frame of an aircraft seat which includes first and second legrest panels slidably secured together. A first hydraulic actuator rotates the first panel relative to the frame of the seat and a second actuator moves the second panel relative to the first panel. The actuators are controlled independently.

20 Claims, 9 Drawing Sheets

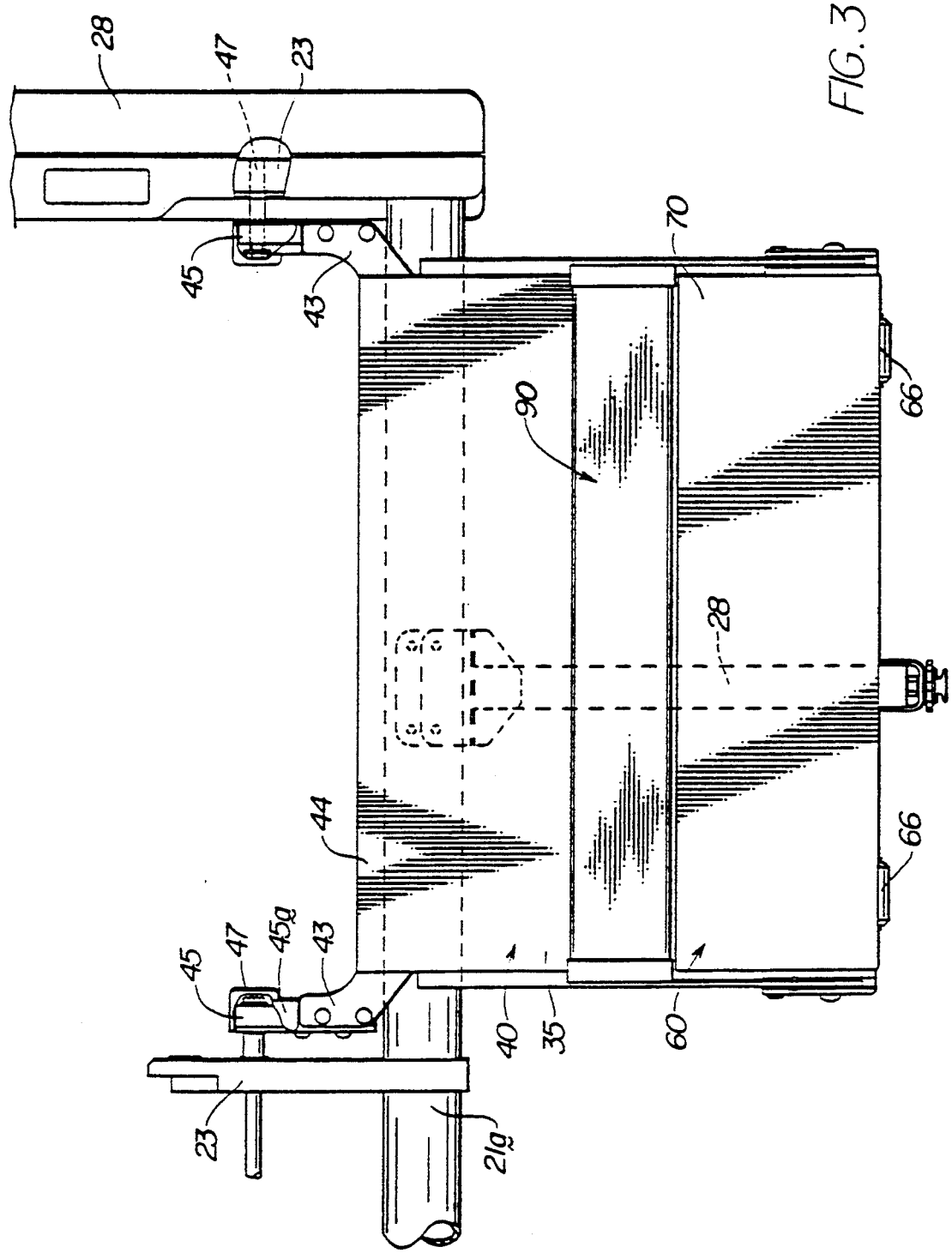

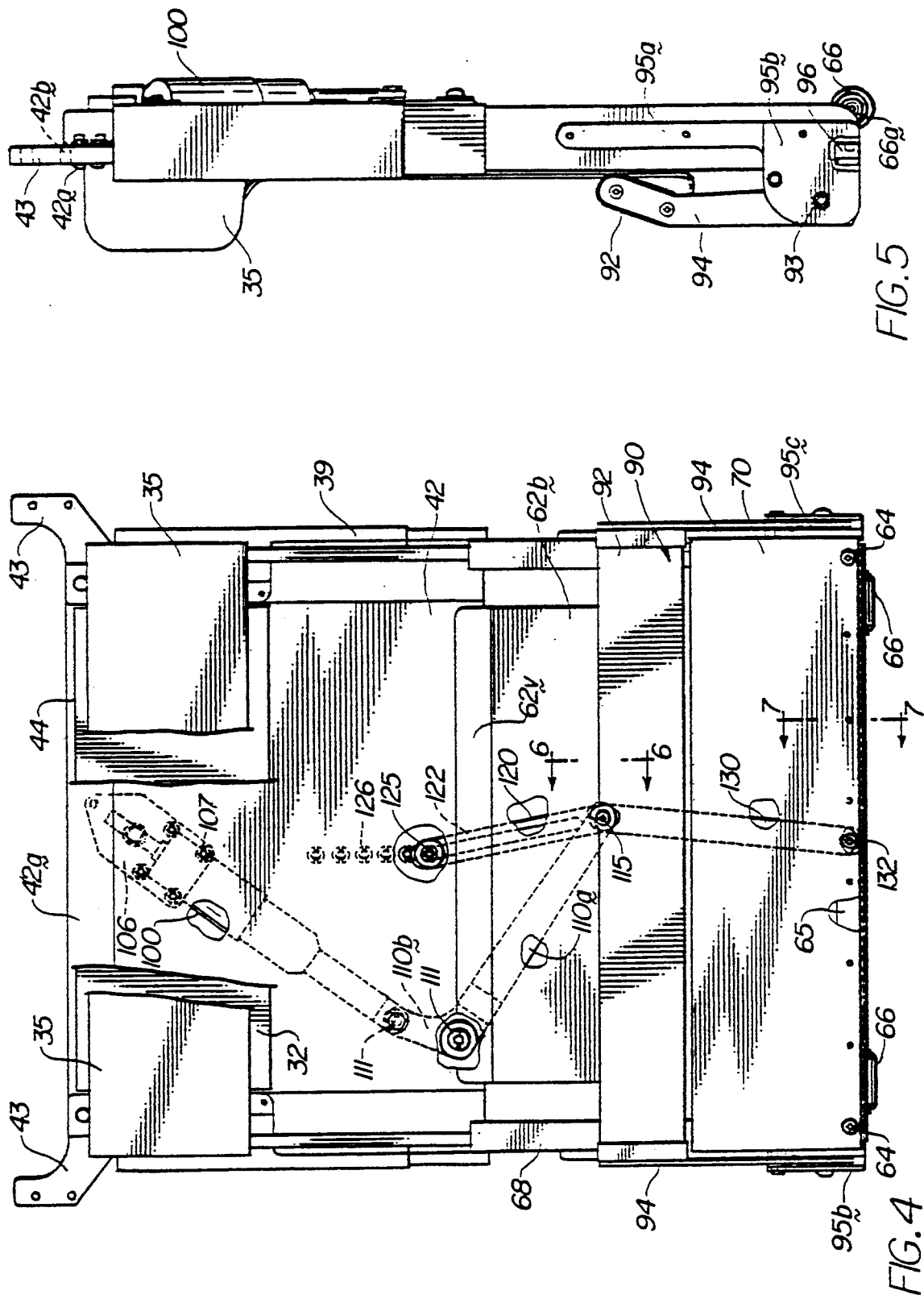

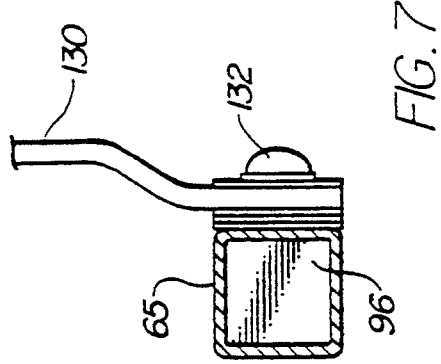
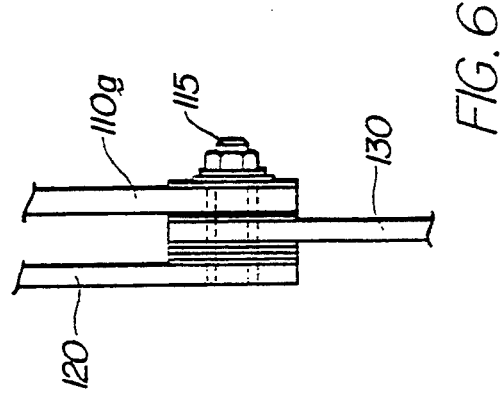

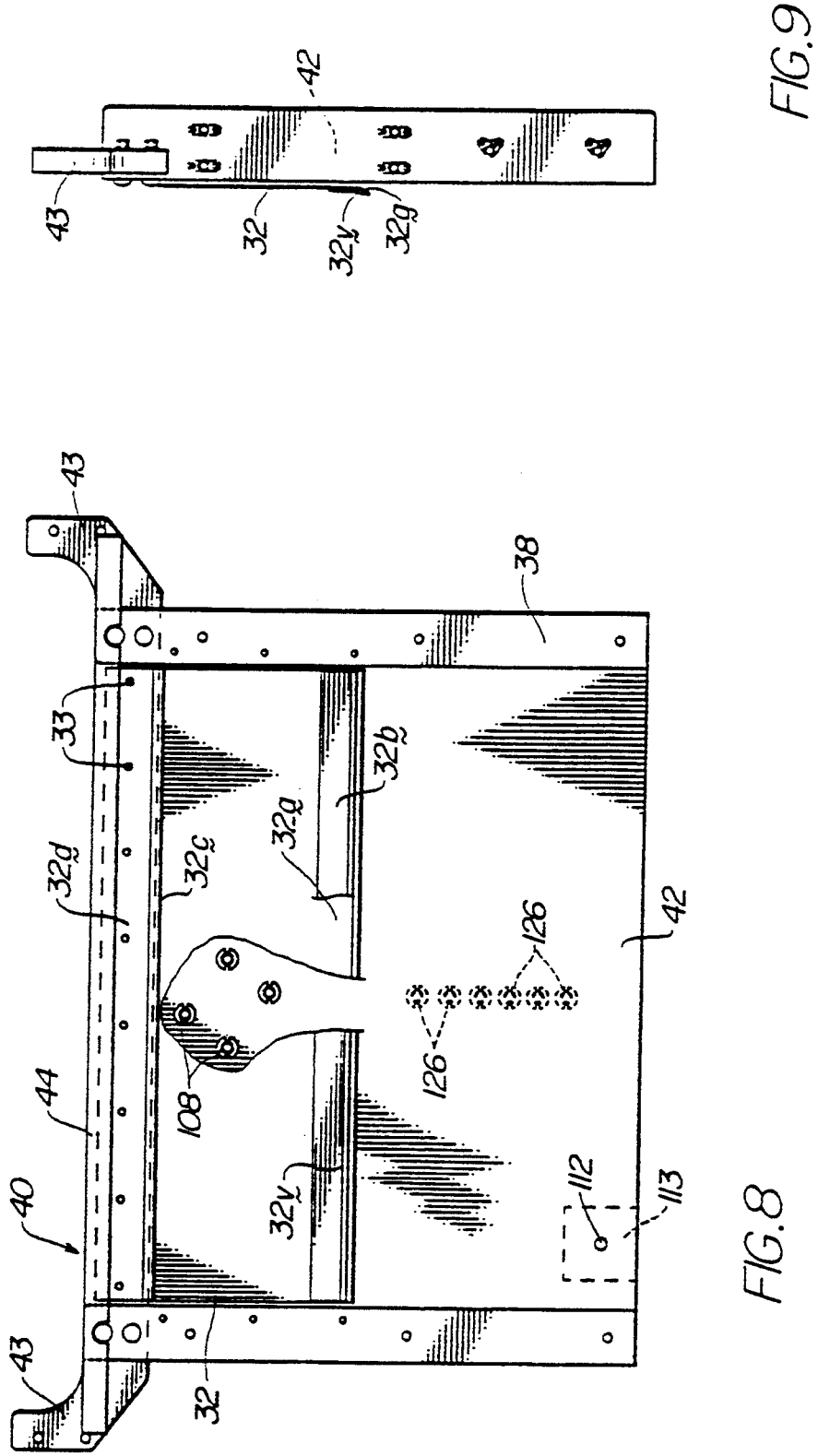

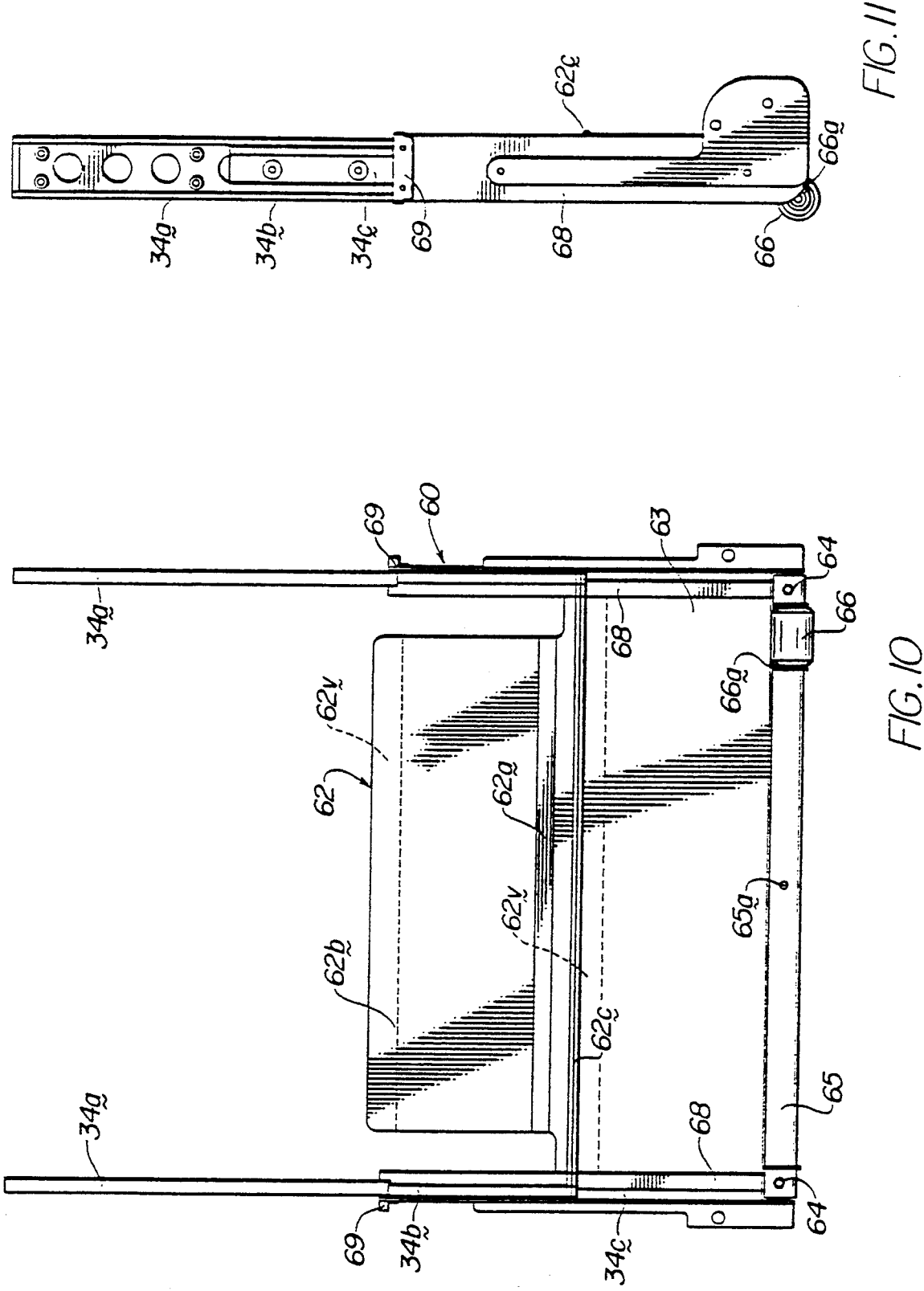

HYDRAULIC EXTENDABLE LEGREST

TECHNICAL FIELD

The invention relates to an infinite position, fully hydraulic, extendable and self-retractable legrest which may be installed on a passenger seat in an aircraft.

BACKGROUND OF INVENTION

The invention disclosed herein relates to improvements in extendable legrests or footrests of the type disclosed in U.S. Pat. No. 4,819,987 and U.S. Pat. No. 4,509,795 for passenger seats. U.S. Pat. No. 4,819,987 discloses an extendable foot rest pivotally mounted on the underside of a passenger seat. The foot rest comprises an outwardly extending leg portion which is pivotally connected to the frame and a foot bar pivotally connected to the legrest. The legrest is extended by a hydraulic actuator having a piston and cylinder combination with a spring sliding over the cylinder to expand the actuator. Hydraulic fluid is transferred between chambers in the piston and in the cylinder through an orifice controlled by a pressure relief pin. When the orifice is opened by the operation of the pressure relief pin a spring urges the actuator toward an extended position. The hydraulic actuator which extends horizontally under the seat has one end connected to the legrest and another end connected to the seat frame.

U.S. Pat. No. 4,509,795 discloses a self deploying legrest assembly for a passenger seat pivotally mounted to the seat frame with a spring-loaded hydraulic lock mechanism which automatically lifts the legrest to a generally horizontal position when a control button on the armrest is actuated. The legrest panel is pivotally moved to its storage position under the front edge of the seat cushion when the occupant applies force to push it down against the upward biasing force exerted by springs in the actuator while actuating the control button on the armrest. A cushioned pad is provided with side channels which accommodate pairs of slide blocks mounted on the outer ends of a pair of legrest support arms. The cushioned pad can be manually moved fore and aft by the occupant toward the ends of the slide channels to provide the occupant with an infinite number of fore and aft positions which can be retained by friction. A vertically mounted hydraulic actuator is connected to the support arm below the center of the front portion of the seat cushion.

Fully electric seats have been employed to permit extension of the lower portion of a legrest relative to the upper portion thereof. The electrically actuated legrest has a lower panel unit sliding on the underneath side of an upper panel unit and actuated by a mechanism which automatically extends the lower panel unit when the upper panel unit was deployed.

A single control button on the arm of the seat energizes an electric motor to drive a screw type actuator which rotated the upper panel unit relative to the seat and simultaneously extended the lower panel unit in unison relative to the upper panel unit.

SUMMARY

The legrest disclosed herein is adapted for infinite positioning within a known range and extends to accommodate people of various sizes. In addition, the legrest is self-retractable from the extended position.

The legrest consists of two panels; one a rotating honeycomb core panel assembly attached to the seat structure, the other an aluminum panel assembly which slides outward from the honeycomb panel assembly. Deployment of the legrest is accomplished by depressing a button located in the seat armrest which actuates a hydraulic lock located adjacent the side of the seat pan, causing forward rotation of the legrest. Deployment of the extendable lower half of the legrest is accomplished by depressing a separate button located in the seat armrest which actuates an additional hydraulic lock located on the back surface of the honeycomb panel assembly. Thus, the first and second panels are deployed independently. A three-bar linkage system, kinematically designed to use the full travel of the hydraulic lock to obtain maximum extension of the legrest, provides maximum extension which is approximately twice the height of the stowed legrest.

DESCRIPTION OF DRAWINGS

Drawings of a preferred embodiment of the invention are annexed hereto so that the invention may be better and more fully understood, in which:

FIG. 3 is a front elevational view;

FIG. 4 is a front elevational view similar to FIG. 2; the legrest being illustrated in an extended position;

FIG. 5 is a side elevational view of the legrest in the extended position;

FIG. 6 is a cross-sectional view taken along line 6—6 of FIG. 4;

FIG. 7 is a cross-sectional view taken along line 7—7 of FIG. 4;

FIG. 8 is a front elevational view of a panel assembly;

FIG. 9 is a side elevational view thereof;

FIG. 10 is a front elevational view of an extendable panel assembly;

FIG. 11 is a side elevational view thereof; and

Numeral references are employed to designate like parts throughout the various figures of the drawing.

DESCRIPTION OF A PREFERRED EMBODIMENT

Figure 1:
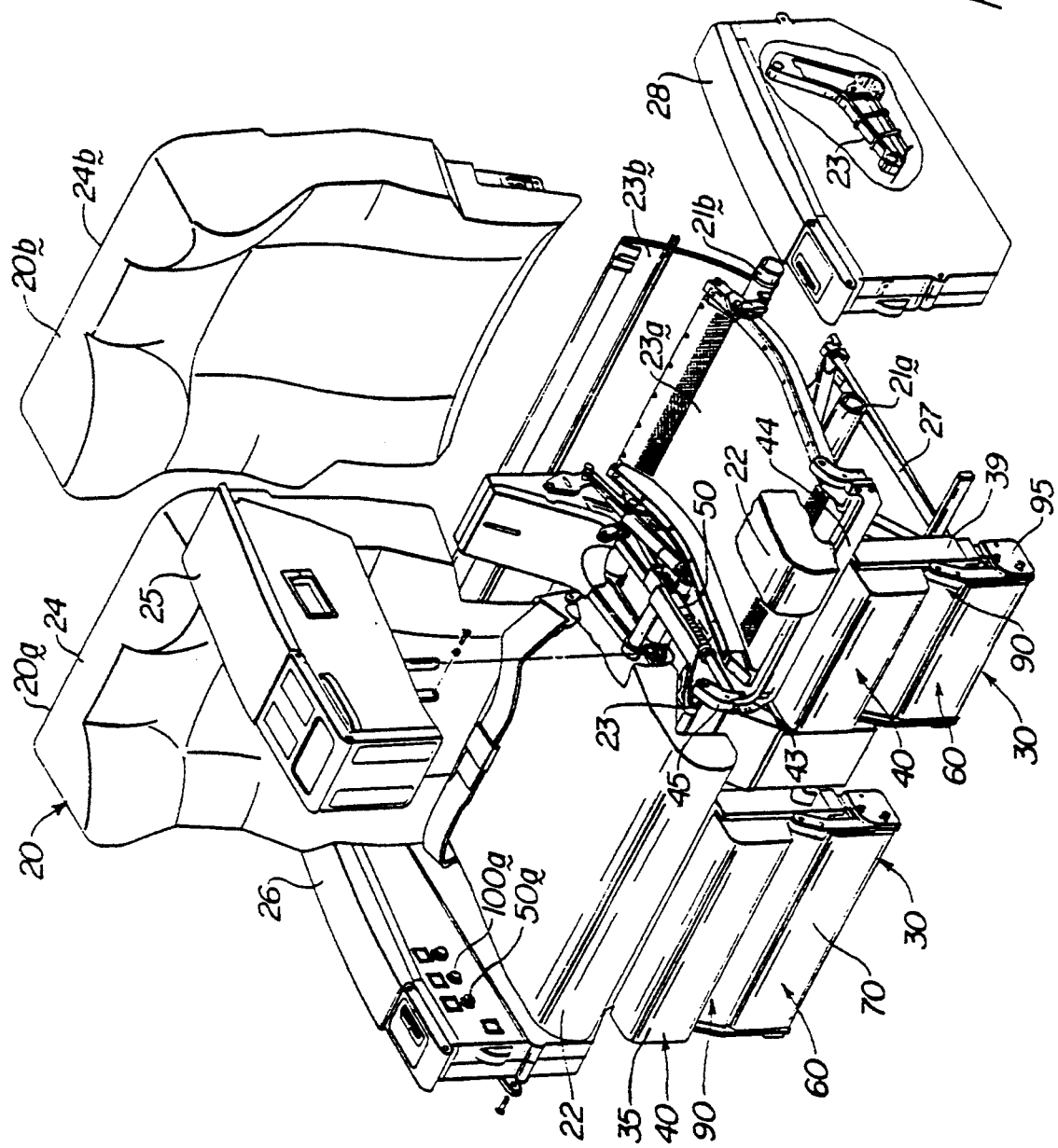
FIG. 1 is a fragmentary perspective view of a double seat assembly for an aircraft having a hydraulically actuated legrest mounted thereon.

Referring to FIG. 1 of the drawing, the numeral 20 generally designates a double seat having a pair of bottom cushions 22, reclining seat backs 24, a center armrest 25 and a pair of outer armrests 26 and 28. A base frame is formed by spaced tubular members 21a and 21b joined by spreaders 23 which extend along each side of each seat bottom cushion 22. A seat pan 23a is mounted upon tubular frame 21a and 21b and between spreaders 23 and a trim panel 23b covers the joint between the seat back 24 and seat bottom cushions 22. Tubular members 21a and 21b are supported by leg assemblies 27 provided with track fittings 29 for securing the seat to a track (not shown) mounted in the floor F of an aircraft. Armrests 25, 26 and 28, seat backs 24 and legrest assemblies, generally designated by the numeral 30, in FIG. 1, are pivotally secured between the spreaders 23.

Seat 20 in the illustrated embodiment is particularly designed for installation in an aircraft. However, it is contemplated that the legrest assembly 30 may be mounted on seats for other vehicles, such as trains, boats, buses or automobiles and may also be mounted in furniture for the home or office. While the following description will be limited primarily to an aircraft seat, it will be appreciated that the legrest 30 may be adapted for installation in any seat to provide a comfortable legrest.

In the illustrated embodiment of the seat 20, the legrest 30 on the window seat 24b is narrower than the legrest on the aisle seat 20a to accommodate the curved wall of the aircraft.

Each legrest assembly 30 is formed by a pair of panels 40 and 60. As will be hereinafter more fully explained, an upper panel 40 is preferably pivotally secured between spreaders 23 while a lower panel 60 is movably secured to upper panel 40 and slides outwardly from the full outline position illustrated in FIG. 2 to the dashed outline position. A footrest assembly 90 is pivotally secured to the outer end of the extendable lower legrest panel 60.

Referring to FIGS. 4, 8, 9 and 12A, the upper panel 40 comprises a sheet 42 of honeycomb core material 42c sandwiched between metallic skin sheets 42a and 42b, sheet 42 having a hinge bar 44 extending transversely along an upper edge thereof. Some of the honeycomb core material 42c is removed so that bar 44 drops down between the metallic skins 42a and 42b.

Figure 12A:
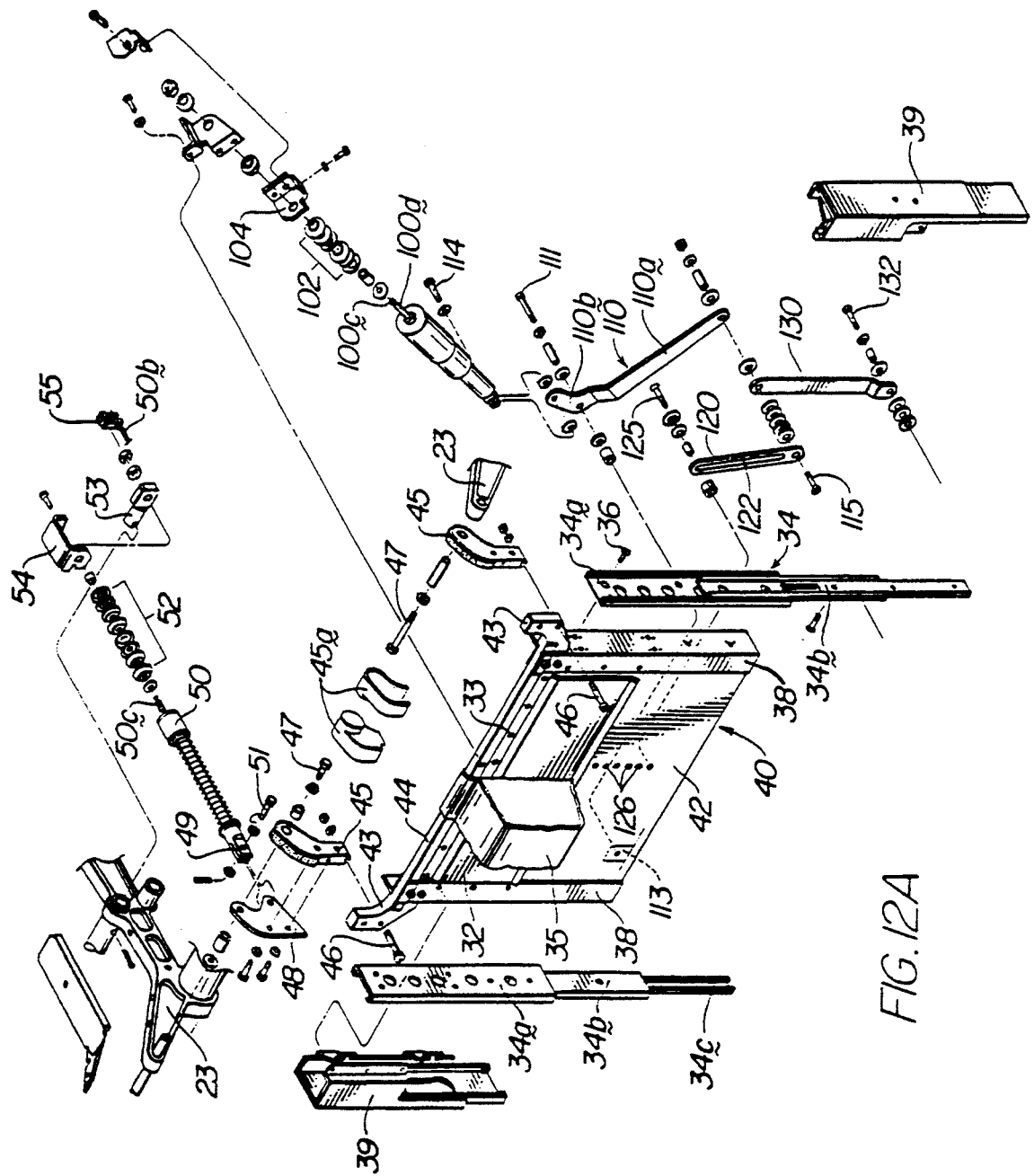
FIGS. 12 and 12B is an exploded perspective view of the legrest assembly.

Hinge bar 44 has lugs 43 formed on opposite ends thereof which are secured by screws 46, best illustrated in FIG. 12A, to hinge arms 45 pivotally secured by bolts 47 extending through bushings into openings formed in spreader 23.

A hinge plate 48 is secured by a pair of screws to each hinge arm 45 to provide a support for a clevis 49 formed on the end of a hydraulic recline locking cylinder 50 by a pivot pin 51. The opposite end of recline locking cylinder 50 has a threaded pin formed on the end thereof which extends through Belleville spring washers 52 and extends through an opening formed in channel member 54, through an opening in trunnion 53 and into an opening in a cable actuated lock mechanism 55.

Many types of actuation assemblies may be employed for deploying the legrest 30; however, a preferred form of actuating device 50 is of the type disclosed in U.S. Pat. No. 4,819,987 which issued Apr. 11, 1989, to Calvin R. Stringer entitled "Aircraft Seat Leg Support Release", the disclosure of which is incorporated herein by reference in its entirety. Hydraulic locking cylinders equipped with pushbutton cable controlled valves are commercially available from P. L. Porter Co. under the registered trademark "HYDROLOK".

A pair of shrouds 45a are mounted on hinge arms 45 to cover bolts 47 and hinge arms 45.

A cushion 35 is mounted on a cover plate 32 secured by screws 33 to hinge bar 44. It should be noted that cover plate 32 and sheet 42 are mounted to provide a recess between adjacent surfaces to receive a portion of slide sheet 62 on the lower panel 60, as will be hereinafter more fully explained.

Slide members 34, formed by a pair of channel members 34a and 34b and a slide bar 34c, are secured by screws 36 to angle members 38 which extend along spaced edges of sheet 42 of honeycomb material. Slide members 34 movably secure legrest assemblies 40 and 60, as will be hereinafter more fully explained. Slide members 34 are of the general type which are commercially available from Actron Manufacturing, Inc. of Anaheim, Calif.

Covers 39 are provided to conceal slide channels 34a and 34b.

Figure 12B:
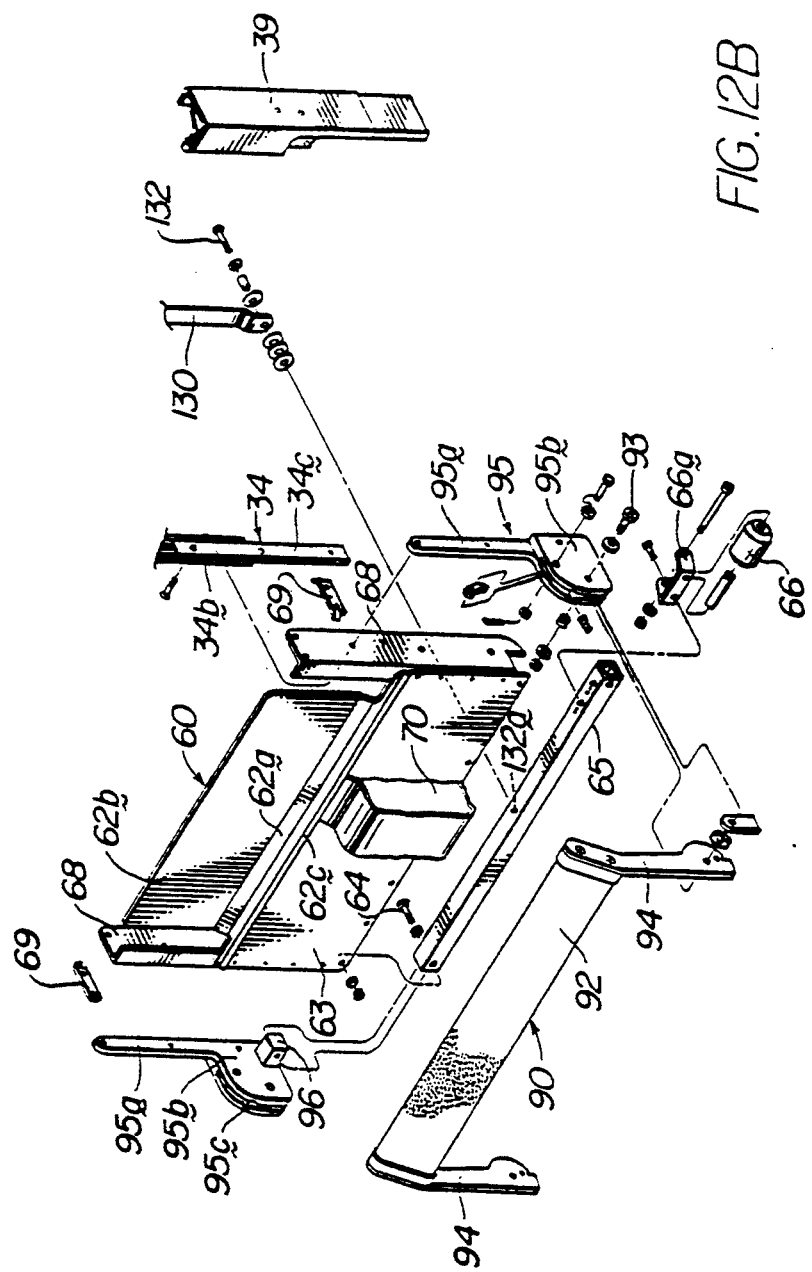

The extendable lower portion 60, best illustrated in FIGS. 10, 11 and 12B, of the legrest assembly 30 comprises a slide plate 62 having a deflected central portion 62a between an upper slide portion 62b and a lower mounting portion 63 secured by bolts 64 to a tube 65 which extends across the lower edge of mounting portion 63. A pair of rollers 66, mounted in brackets 66a secured to tube 65 adjacent the lower end of legrest 30, carry loads applied to the legrest if the outer end of the legrest 30 engages the floor F when the lower panel 60 is fully extended (shown in dashed outline in FIG. 2) and the upper panel 40 is rotated toward the stowed position.

In normal operation rollers 66 do not come in contact with the floor. However, since the legrest 30 can be extended to engage the floor, rollers 66 protect the floor and the legrest 30 in the event that the lower end of the legrest 30 engages the floor. For example, if the occupant lowers the legrest 30 while the lower panel 60 is extended and then retracts the upper panel 40 while weight is applied, rollers 66 roll along the carpet on the floor.

A stiffener rib 62c is formed in slide plate 62 adjacent to the deflected portion 62a.

As best illustrated in FIGS. 10, 11 and 12A and 12B, angle members 68 are spot welded along lateral edges of mounting portion 63 of slide plate 62. Screws 64 secure ends of angle members 68 to the tubular member 65 while screws 65a fasten the lower edge of mounting portion 63 to tubular member 65.

Slide bars 34c of slide members 34 are secured to angle members 68 for movably securing lower panel 60 to upper panel 40. Slide stops 69 are secured to upper ends of angle members 68 to control movement of lower panel 60 relative to upper panel 40.

Strips 62v of VELCRO fastener material are secured to upper surfaces of cover plate 62 for securing a footrest cushion 70 and a legrest skirt (not shown) to lower panel assembly 60.

A footrest assembly 90, pivotally secured to the lower end of lower panel 60 comprises a carpet covered foot bar 92 extending between arms 94 pivotally secured by a pivot pin 93 to footrest support arms 95. Footrest hinge members 95 are provided with a support arm 95a secured to angle members 68 and a hinge portion 96b having a slot 95c formed therein into which lower ends of arms 94 extend. Pivot pins 93 extend through openings in hinge portions 96b and through openings formed in the lower end of arms 94.

As best illustrated in FIG. 12B, each hinge member 95 has an outwardly projecting lug 96 formed thereon which extends into the hollow portion of tube 65 and support arms 95a are rigidly secured by screws or other suitable fasteners to angle members 68. Thus, hinge members 95 are rigidly secured to lower panel member 60 and pivotally support the footrest assembly 90, while providing a strong construction which is capable of withstanding substantial forces which may be encountered in devices actuated by the foot of an occupant of the seat.

As best illustrated in FIGS. 4, 5 and 12A of the drawing, a hydraulic locking cylinder 100 is mounted in an actuator assembly of the type disclosed in U.S. Pat. No. 4,819,987 which issued Apr. 11, 1989, to Calvin R. Stringer entitled "AIRCRAFT BEAT LEG SUPPORT RELEASE DEVICE". A suitable actuator is commercially available from P. L. Porter Company of Woodland Hills, Calif. under the trademark "HYDROLOK".

Locking cylinder 100 has a pressure relief pin 100c on the outer end of a threaded stem 100d which is actuated by a push button 100a on seat arm 26 through a cable connected to a valve actuator in a manner well known to persons skilled in the art. Locking cylinder 100 has a threaded pin formed on the end thereof which extends through Belleville spring washers 102 and extends through an opening formed in a bracket 104 and into a cable actuated lock mechanism which actuates pressure relief pin 100c.

As best illustrated in FIG. 4 of the drawing, locking cylinder 100 is provided with a mounting flange 106 secured by bolts 107 extending through an array of holes 108 extending through sheet 42 on upper legrest panel 40. An actuator arm 110 is pivotally secured by a screw 111 which extends into an opening 112 formed in a reinforcing block 113 embedded in the honeycomb core portion 42c of sheet 42.

It should be noted that actuator arm 110 is in the form of a bell crank having a long leg 110a and a short leg 110b intersecting at an included angle of slightly greater than 90°. The short leg 110b of actuator arm 110 is connected by a bolt 114 to the end of locking cylinder 100 such that extension and retraction of locking cylinder 100 rotates actuator arm 110 about screw 111.

As best illustrated in FIGS. 4 and 6 of the drawing, the outer end of the long arm 110a of actuator arm 110 is pivotally secured by a pivot pin 115 to adjacent ends of actuator links 120 and 130.

Actuator link 120 has an opening in one end thereof through which pivot pin 115 extends and is provided with an elongated slot 122 which extends through a substantial portion of the length of actuator arm 120. A screw 125 extends through slot 122 and has a threaded end which threadedly engages spaced internally threaded nuts 126 embedded in the honeycomb core 42c of sheet 42. The threaded nuts are arranged in an array to permit adjustment of the position of screw 25 for limiting the maximum extension of lower panel 60 relative to the upper panel 40.

As best illustrated in FIGS. 4, 7 and 12A and B, actuator link 130 has an opening formed in an upper end thereof through which pivot pin 115 extends for connecting actuator links 120 and 130 to the end of leg 110a a of actuator arm 110. The opposite end of actuator link 130 is connected by a screw 132 extending through an opening in the lower end of actuator link 130 and into an opening 132a formed in tubular member 65 extending across the lower end of mounting portion 63 of slide plate 62 on the lower panel portion 60.

OPERATION

From the foregoing it should be readily apparent that hydraulic locking cylinders 50 are mounted under the center armrest 25 of seat 20 adjacent to the edge of the seat pan 23c which supports the seat bottom cushion 22. Thus, locking cylinder 50 does not extend into space under the seat which is preferably left available for storage of luggage and to provide leg room for passengers seated in the next row of seats. Further, hydraulic locking cylinder 50 does not require any connection to an external source of electrical power or hydraulic fluid. Similarly, hydraulic locking cylinder 100, mounted on the rear or back surface of legrest panel 40 does not require any connection to an external source of electrical power or hydraulic fluid.

Hydraulic locking cylinders 50 and 100 are controlled separately and independently by push buttons 50a and 100a mounted in the arm 26 of seat 20. Thus, lower panel 60 can be extended or retracted independently of movement of the upper legrest panel 40.

Figure 2:
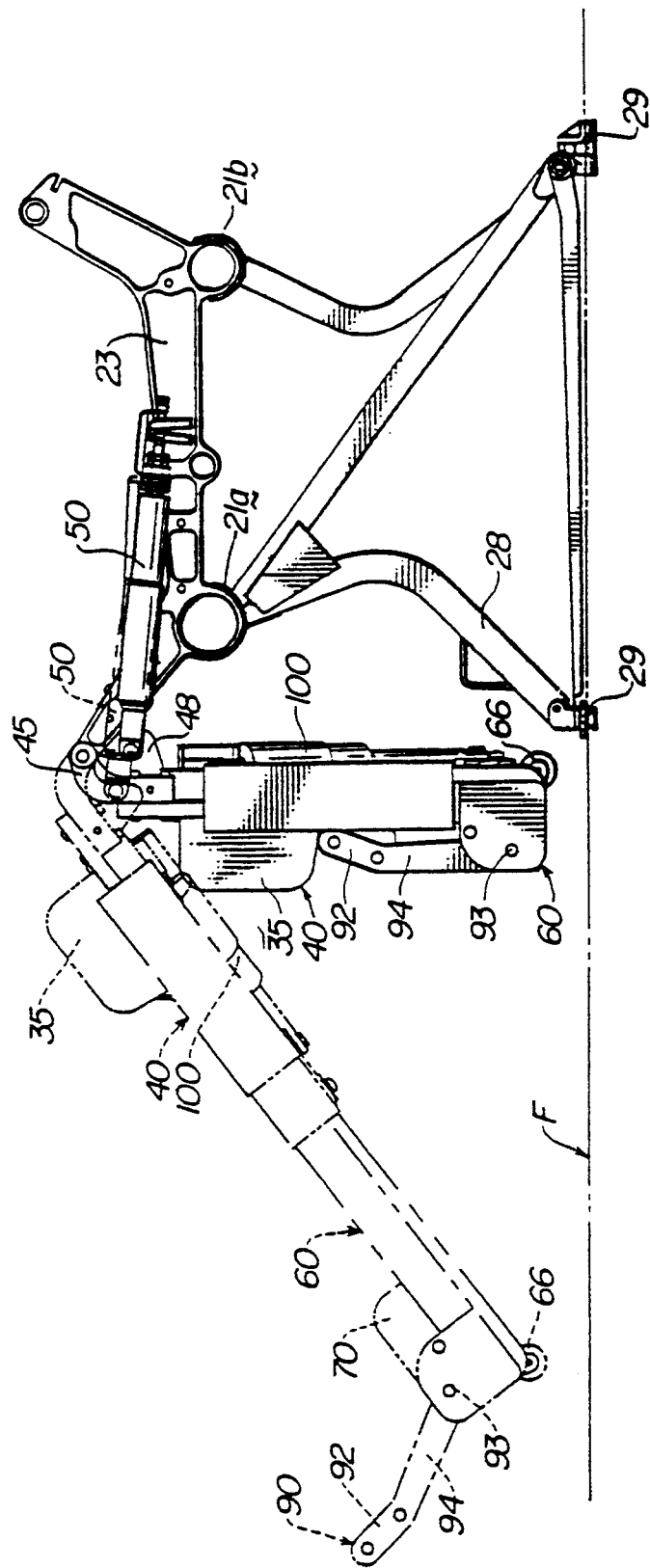
FIG. 2 is a side elevational view of the legrest pivotally secured to a seat frame.

Locking cylinder 50 urges upper panel 40 toward the deployed position illustrated in dashed outline in FIG. 2 of the drawing, while hydraulic locking cylinder 100 urges the lower panel 60 toward its retracted position illustrated in full outline in FIG. 2 of the drawing. Thus, when a passenger presses push button 50a, the upper panel 40 of legrest 30 automatically rotates to its deployed position while the lower panel 60 remains in its retracted position.

If the passenger depresses push button 100a on seat arm 26 and pushes downwardly on the padded foot bar 92, the lower panel 60 will be extended to the position illustrated in dashed outline in FIG. 2. Rotation of upper panel 40 can be stopped by the passenger at any desired angle by releasing push button 50a. Lower panel 60 can be extended any distance desired by the passenger and retained in position by releasing push button 100a.

For moving the legrest 30 to the stowed position illustrated in full outline in FIG. 2 of the drawing, the passenger removes his feet from the padded foot bar 92 and depresses push button 100a which opens the orifice in locking cylinder 100 so that the spring in locking cylinder 100 retracts the lower panel 60.

Referring to FIGS. 3, 4 and 8 of the drawing, it should be noted that the upper legrest cushion 35 is mounted on cover plate 32 which is configured to support legrest cushion 35 in a spaced relationship from the upper surface of sheet 42 so that the upper edge of slide plate 62 moves into space between the lower surface of cover plate 32 and the upper surface of sheet 42 when the lower panel 60 is retracted. Foot rest assembly 90, carried on lower panel 60 is moved to a position adjacent to upper cushion 35 to provide an aesthetically pleasing appearance when the footrest is retracted to the position illustrated in FIG. 1 of the drawing.

Screw 125 which extends through slot 122 in actuator link 120 provides an adjustable stop in, for example, one inch increments for adapting the legrest 30 for installation on seats having varying amounts of leg space between the front of the seat on which the legrest is mounted and the back of a seat in an adjacent row of seats.

Since locking cylinders 50 and 100 are actuated separately, the provision of rollers 66 on the lower end of lower panel 60 protect the carpet on the floor F of the aircraft and the legrest 30 from damage when operated by inexperienced passengers.

As described hereinbefore the actuation assemblies preferably includes a hydraulic locking cylinders 50 and 100 of the type having a piston and cylinder combination with the piston sliding within the cylinder to extend the locking cylinder 50 or 100. Hydraulic fluid is transferred between chambers in the cylinder through an orifice located therebetween. The opening and closing of the orifice is controlled by a pressure relief pin 50c or 100c wherein the hydraulic locking cylinder 50 or 100 permits normal extension and retraction only when the orifice is opened by the operation of the pressure relief pin 50c or 100c. Typically, the locking cylinder 50 is biased to an extended position by a spring such that when the pressure relief pin 50c or 100c is actuated, the hydraulic locking cylinder 50 or 100 extends to deploy the legrest 30. Cylinder 100 is in the extended position when footrest 60 is in the stowed position and is in the compressed position when footrest 60 is extended.

The pressure relief pin 50c or 100c are actuated by controller buttons 50a and 100a, respectively typically located on the armrest 26 of the passenger seat 24. A control cable 50b or 100b in a cable sleeve extends from control button 50a or 100a to the hydraulic locking cylinder 50 or 100. The control cable 50b or 100b is connected to a lever which pivots about a pivot point, the pivoting motion actuating or releasing the pressure relief pin 50c or 100c. The legrest 30 is extended by pressing the controller button located on the armrest which pulls the control cable 50b thereby pivoting the lever for depressing the pressure relief pin 50c or 100c which opens the orifice within hydraulic locking cylinder 50 or 100 allowing the biased expansion of the locking cylinder 50 or 100 to extend the upper legrest panel 40. Upon release of the controller, the pressure relief pin 50c or 100c, which is biased to a position closing the orifice, returns to its closed position and the lever returns to its resting position. The resting position of pressure relief pin 50c or 100c is set by a nut which rests against a sleeve as the pressure relief pin 50c or 100c slides inside sleeve 54. The resting position of the lever is set by a set screw held in position on bracket 54 which is attached to the sleeve.

When the controller is actuated, pressure relief pin 50c or 100c opens the orifice and the upper panel 40 may be manually pivoted in opposition to the biasing force of the locking cylinder 50 or 100 to position the legrest under seat bottom cushion 22.

Actuation assembly 50 also includes a pressure relief system which permits retraction of legrest 30 when a predetermined load is applied on the legrest 30 toward the stowed position without actuating the control button.

Belleville spring washers 52 are located on the rear end of the locking cylinder 50. Upon application of force upon the legrest 30 toward its stowed position, the springs 52 are compressed by longitudinal movement of the entire locking cylinder 50, the end of the locking cylinder 50 including the pressure relief pin 50c or 100c slide through the sleeve 54. The pin 50c or 100c and the lever move toward set screw. At a given force, typically chosen to be about 150 lbs. applied to the legrest 30 toward the stowed position, the lever contacts the set screw and pivots into contact with the pressure relief pin 50c or 100c thereby actuating the pressure relief pin 50c or 100c and opening the orifice in the hydraulic locking cylinder 50. Once the hydraulic pressure relief pin 50c or 100c is actuated, the locking cylinder 50 may contract and the legrest 30 may swing toward its stowed position. The load at which the legrest 30 actuates the pressure relief system 30 may be chosen by selecting the stiffness of the spring 38.

Hydraulic lock cylinder 100 is provided with a similar "breakover" release device.

We claim:

1. An extendable legrest movably secured to a seat frame having armrests adjacent opposite sides of a seat portion supported by the frame comprising: a legrest assembly; means pivotally securing said legrest assembly to the frame; actuator means; means securing said actuator means to the frame adjacent the armrest and adjacent an edge of the seat portion such that the actuator means does not project into space below the seat portion; means operably connecting said actuator means and said legrest assembly; and control means on one of the armrests and connected to actuate said actuator means to pivot said legrest assembly relative to the frame.

2. A legrest assembly for mounting on a seat frame which supports a seat comprising: a first legrest panel; means pivotally securing said first legrest panel to said seat frame; a second legrest panel; means slidably securing said second legrest panel to said first legrest panel; first actuator means connected between said seat frame and said first legrest panel for rotating said first legrest panel relative to said frame; second actuator means secured between said first and second legrest panels; and control means connected to said first and second actuator means for actuating said first and second actuator means independently of each other.

3. A legrest assembly according to claim 2, with the addition of roller means on said second panel, said roller means being positioned to prevent damaging said second panel if said second panel contacts a floor supporting the seat frame.

4. A legrest assembly according to claim 2, said first panel comprising: a rigid sheet; a cover plate; means securing said cover plate to said rigid sheet to form a recess between said cover plate and said rigid sheet; and means securing a cushion to said cover plate.

5. A legrest assembly according to claim 4, said second panel comprising: a slide plate; means securing a second cushion to said slide plate; and means slidably connecting said second panel to said first panel such that a portion of said slide plate moves into said recess between said cover plate and said rigid sheet when said second panel is in a retracted position and moves through said recess when said second panel is moved toward an extended position.

6. A legrest assembly according to claim 2, said second actuator means comprising: an actuator arm pivotally secured to said first legrest panel; a hydraulic locking cylinder connected to said actuator arm; and an actuator link pivotally secured between said actuator arm and said second panel such that said second panel is moved relative to said first panel upon movement of said actuator arm.

7. A legrest assembly according to claim 6, with the addition of: a second actuator link operably connected to said actuator arm, said second actuator link having an elongated slot formed therein; and stop means secured to said first panel and extending into said slot in said second actuator link for limiting movement of said actuator arm relative to said first panel.

8. A legrest assembly according to claim 7, said stop means comprising: an array of spaced openings in said first legrest panel for receiving said stop means such that the limits of movement of said actuator arm are adjustable.

9. A method of deploying a legrest assembly formed by first and second panels slidably secured together and a footrest pivotally secured to one of the panels comprising the steps of: rotating the first and second panels about an axis; urging the second panel longitudinally of the first panel to extend the legrest against the bias of a spring biased plunger; locking the second panel in a desired position relative to the first panel; and releasing the spring biased plunger to release energy for retracting said second panel longitudinally of the first panel.

10. A method of deploying a legrest assembly formed by first and second panels slidably secured together and a footrest pivotally secured to one of the panels comprising the steps of: releasing a spring biased plunger to release energy for rotating said first and second panels about an axis; urging the second panel longitudinally of the first panel; and locking the second panel in a desired position relative to the first panel.

11. An extendable legrest assembly for mounting on a seat frame having armrests adjacent opposite sides of a seat supported on the seat frame comprising: a first legrest panel pivotally secured to the seat frame; a second legrest panel mounted on said first legrest panel for movement longitudinally of said first legrest panel; a footrest assembly pivotally secured to said second legrest panel; first and second actuation assemblies on said legrest assembly, said first actuation assembly being connected between said seat frame and said first legrest panel, said second actuation assembly being secured between said first and second legrest panels; and first and second control devices connected to said first and second actuation assemblies to permit deployment of the legrest assembly by rotation of the first and second legrest panels relative to said seat frame and deployment of said second legrest panel longitudinally relative to said first legrest panel.

12. An extendable legrest assembly according to claim 11, said first legrest panel comprising: a honeycomb core panel assembly, said second legrest panel being slidably secured to said honeycomb core panel.

13. An extendable legrest assembly according to claim 11, said first actuation assembly being secured to said seat frame adjacent the armrest and adjacent an edge of the seat portion such that said first actuation assembly does not project into space below the seat portion.

14. An extendable legrest movably secured to a seat frame having armrests adjacent opposite sides of a seat portion supported by the frame comprising:
a legrest assembly formed by first and second legrest panels;
means pivotally securing said legrest assembly to the frame;
first actuator means connected to said legrest assembly and to the frame adjacent the armrest and adjacent an edge of the seat portion such that said first actuator means does not project into space below the seat portion;
means movably securing said second legrest panel to said first legrest panel;
second actuator means connected between said first and second legrest panels;
first control means on one of said armrests and connected to actuate said first actuator means to pivot said legrest assembly relative to the frame; and
second control means on one of said armrests and connected to said second actuator means, said first and second control means being adapted to actuate each of said first and second actuator means separately and independently of the other.

15. An extendable legrest according to claim 14, said second actuator means comprising: an actuator arm pivotally secured to said first legrest panel; a hydraulic locking cylinder connected to said actuator arm; and actuator link means pivotally secured between said actuator arm and said second panel such that said second panel is moved relative to said first panel upon movement of said actuator arm.

16. An extendable legrest according to claim 15, with the addition of: second actuator link means operably connected to said actuator arm, said second actuator link means having an elongated slot formed therein; and stop means secured to said first panel and extending into said slot in said second actuator link means for limiting movement of said actuator arm relative to said first panel.

17. An extendable legrest according to claim 16, said stop means comprising: an array of spaced openings in said first panel for receiving said stop means such that the limit of movement of said actuator arm is adjustable.

18. An extendable legrest according to claim 17, with the addition of: roller means on said second panel, said roller means being positioned to prevent damaging said second panel if said second panel contacts a floor supporting the seat frame.

19. An extendable legrest according to claim 14, said first panel comprising: a rigid sheet; a cover plate; means securing said cover plate to said rigid sheet to form a recess between said cover plate and said rigid sheet; and means securing a cushion to said cover plate.

20. An extendable legrest according to claim 19, said second panel comprising: a slide plate; means securing a second cushion to said slide plate; and means slidably connecting said second panel to said first panel such that a portion of said slide plate moves into said recess between said cover plate and said rigid sheet when said second panel is in a retracted position and moves through said recess when said second panel is moved toward an extended position.

* * * * *

UNITED STATES PATENT AND TRADEMARK OFFICE
CERTIFICATE OF CORRECTION

PATENT NO. : 5,352,020
DATED : October 4, 1994
INVENTOR(S) : Douglas L. Wade, Wade Walterscheld & Jim Shepherd It is certified that error appears in the above-identified patent and that said Letters Patent is hereby corrected as shown below:

Column 2, line 43, after "12" insert --A--.
Column 4, line 50, delete "96b" and insert --95b--.
Column 4, line 67, delete "BEAT" and insert --SEAT--.
Column 7, line 10, change "100ato to read --100a to--.

Signed and Sealed this

Twenty-second Day of November, 1994

*Attest:*

BRUCE LEHMAN

*Attesting Officer*  *Commissioner of Patents and Trademarks*